United States Patent [19]

Kawamoto

[11] Patent Number: 4,550,629
[45] Date of Patent: Nov. 5, 1985

[54] CONTINUOUSLY VARIABLE SPEED TRANSMISSION FOR MOTOR VEHICLES

[75] Inventor: Mutsumi Kawamoto, Aichi, Japan

[73] Assignee: Aisin Warner Kabushiki Kaisha, Aichi, Japan

[21] Appl. No.: 404,730

[22] Filed: Aug. 3, 1982

[51] Int. Cl.⁴ .............................................. F16H 57/10
[52] U.S. Cl. ........................................ 74/689; 74/763; 74/782; 74/784; 74/790; 74/792
[58] Field of Search .................. 74/689, 762, 763, 782, 74/790, 781 R, 783, 784, 789, 791, 792

[56] References Cited

U.S. PATENT DOCUMENTS

| | | | |
|---|---|---|---|
| 2,164,818 | 7/1939 | Heyer et al. | 74/689 |
| 3,338,360 | 8/1967 | Cornillaud | 74/763 X |
| 3,339,431 | 9/1967 | Croswhite et al. | 74/763 X |
| 3,383,954 | 5/1968 | McFarland | 74/763 X |
| 3,483,771 | 12/1969 | Förster et al. | 74/763 X |
| 3,563,115 | 2/1971 | Iijima et al. | 74/763 X |
| 3,580,109 | 5/1971 | Hill | 74/763 |
| 3,812,739 | 5/1974 | Mori et al. | 74/763 |
| 3,924,491 | 12/1975 | Kalversberg | 74/763 |
| 4,353,270 | 10/1982 | Falzoni | 74/689 |
| 4,395,925 | 8/1983 | Gaus | 74/763 |

FOREIGN PATENT DOCUMENTS 56-49459  5/1981  Japan ..................... 74/689

Primary Examiner—Leslie A. Braun
Assistant Examiner—Dwight G. Diehl
Attorney, Agent, or Firm—Blum Kaplan Friedman Silberman & Beran

[57] ABSTRACT

A continuously-variable speed transmission for motor vehicles, which transmission comprises an input variable pitch pulley arranged on the input shaft of the transmission, an output variable pitch pulley arranged on the output shaft of the transmission, an endless belt interconnecting the input and the output variable pitch pulleys, a forward-drive planetary gear mechanism disposed on one axial side of the variable pitch pulley arranged either on said input shaft or on said output shaft, and a reverse-drive planetary gear mechanism disposed on the other axial side of said variable pitch pulley.

16 Claims, 4 Drawing Figures

CONTINUOUSLY VARIABLE SPEED TRANSMISSION FOR MOTOR VEHICLES

BACKGROUND OF THE INVENTION

The present invention relates generally to a continuously-variable speed transmission for motor vehicles and more particularly to a transmission for motor vehicles employing a belt type continuously-variable change ratio device, designated as "a belt device" hereinafter. The belt drive device includes a first variable pitch pulley and a second variable pitch pulley being associated with an input shaft and an output shaft, respectively and rotatively connected.

Each of the variable pitch pulleys of the belt drive device comprises a fixed flange secured to the associated input or output shaft, a movable flange axially and slidably mounted on the other shaft, an endless belt interconnecting said variable pitch pulleys and means capable of regulating the distance between the movable flange and the fixed flange in order to change the radial position of the endless belt which is held between the fixed flange and the movable flange so that the ratio of the revolving speed of the output shaft to that of the input shaft, that is, the speed change ratio, is changed. Belt drive devices of this type are well-known. Incorporation of a belt drive device of this type into a transmission for motor vehicles allows continuously-variable change of the revolving ratio between the input shaft and the output shaft, namely, the speed change ratio, automatically but not necessarily in response to the driver's demands or road conditions.

However, in applying such a belt drive device as described hereinbefore to a transmission for motor vehicles, additional provision of a reversing changeover gear mechanism and a reduction gear is required since the speed change ratio of the belt drive device, in general, is variable within a range of 2.0 to 0.5. The input shaft of the belt drive device and the output shaft of a prime mover are interconnected with a coupling device which transmits rotation without converting the torque, such as a fluid coupling or a clutch, and the output shaft of the belt drive device is connected to the driving axle of a motor vehicle through a conventional final reduction gear mechanism of the hypoid gear type.

Employment of a planetary gear mechanism in the reversing changeover mechanism is desirable in order to provide a compact transmission for motor vehicles. A simple planetary gear mechanism of the single planetary pinion type is unsuitable to the reversing changeover mechanism for the transmission for motor vehicles, owing to a great difference between the gear ratio for normal rotation and that for reverse rotation, which is inherent to the planetary gear mechanism of a single planetary pinion type.

A planetary gear mechanism of the double planetary pinion type is quite favorable, since the gear ratio is 1.0 both for normal rotation and for reverse rotation. However, when the planetary gear mechanism of the double planetary pinion type is coupled directly to the belt drive device as described hereinbefore, a reduction gear ratio of approximately 8 is required of the final reduction gear mechanism. A final reduction gear mechanism of the hypoid gear type with such a great reduction gear ratio has never been available and is not suitable for motor vehicles. Accordingly, machine designers having ordinary skill will incorporate a reduction gear of the necessary reduction gear ratio into a reversing changeover planetary gear mechanism of the double planetary pinion type in order to attain a combination of the belt drive device and a conventional final reduction gear of the hypoid gear type. In this case, it is usual to arrange and interlock the mechanisms in a sequence of a fluid coupling or a clutch, a belt drive device, reversing changeover planetary gear mechanism of the double planetary pinion type, a reduction gear and a conventional final reduction gear mechanism. In a transmission system for motor vehicles thus constructed, torque transmission efficiency is likely to be reduced since the torque of the prime mover is transmitted to the conventional final reduction gear mechanism through two sets of gear trains of a planetary gear mechanism and a reduction gear. At the same time, the high-speed operation of a planetary gear mechanism of the double planetary pinion type affects the durability of the planetary gear mechanism disadvantageously.

What is needed is a continuously variable transmission for motor vehicles which has high torque transmission efficiency, simple construction and high durability.

SUMMARY OF THE INVENTION

Generally speaking, in accordance with the invention, there is provided a continuously-variable transmission for motor vehicles employing the belt drive device described hereinbefore, more particularly, a continuously variable speed transmission for motor vehicles employing a belt drive device, with a reversing changeover gear mechanism and a forward-drive reduction gear mechanism both of simplified construction. The present invention relates to a continuously-variable speed transmission for motor vehicles, having a belt drive device comprising an input shaft, an output shaft, a first variable pitch pulley arranged on the input shaft, a second variable pitch pulley arranged on the output shaft and an endless belt interconnecting the first and second pulleys, an individual forward-drive planetary gear mechanism and an individual reverse-drive planetary gear mechanism.

An intermediate shaft is mounted coaxially either on the input shaft or on the output shaft for relative rotation thereon, while a variable pitch pulley, which is arranged on a shaft which is coaxial with the intermediate shaft, is disposed on the intermediate shaft. A forward-drive planetary gear mechanism and a reverse-drive planetary gear mechanism are disposed on one side of said variable pitch pulley and the other side of said variable pitch pulley, respectively. Either one of the shafts coaxial with the intermediate shaft or the intermediate shaft is rotatively connected to the respective input gears of the forward-drive planetary gear mechanism and the reverse-drive planetary gear mechanism, while the other shaft is rotatively connected to the respective output gears of the forward-drive planetary gear mechanism and the reverse-drive planetary gear mechanism. Each of the forward-drive planetary gear mechanism and the reverse-drive planetary gear mechanism includes a control means capable of controlling the interruption of the rotational transmitting operation of the corresponding planetary gear mechanism.

More particularly, either one of the shafts coaxial with the intermediate shaft or the intermediate shaft is connected to the ring gear of the forward-drive planetary gear mechanism and the sun gear of the reverse-drive planetary gear mechanism, while the other shaft is connected to the planetary carrier of the forward-drive planetary gear mechanism and the ring gear of the reverse-drive planetary gear mechanism so that the rotation of the former shaft, that is, either one of the shafts coaxial with the intermediate shaft or the intermediate shaft, is changed to a rotation of a lower rate. Then the rotation of the lower revolving rate is transmitted to the latter shaft, that is, the other shaft.

The control means for controlling the interruption of the rotational transmitting operation of the forward-drive planetary gear mechanism is a clutch provided between the ring gear or the planetary carrier and the corresponding rotatable shaft, or a brake provided between the sun gear of the forward-drive planetary gear mechanism and the casing of the transmission. The control means for controlling the interruption of the rotational transmitting operation of the reverse-drive planetary gear mechanism is a clutch provided between the ring gear or the sun gear and the corresponding rotatable shaft, or a brake provided between the planetary carrier and the casing of the transmission. Accordingly, each of the forward-drive and the reverse-drive planetary gear mechanisms reduces the rate of rotation transmitted to the input gear to a lower revolving rate and transmits rotation at the lower revolving rate to the corresponding rotatable shaft through the output gear.

During forward running of the motor vehicle, the reverse-drive planetary gear mechanism is made idle by the control means so that the revolving rate of the input shaft of the forward-drive planetary gear mechanism is reduced to the revolving rate of the output shaft produced by multiplying the revolving rate of the input shaft by a ratio equivalent to the product of the speed change ratio of the belt drive means and the reduction gear ratio of the forward-drive planetary gear mechanism. During reverse running of the motor vehicle, the forward-drive planetary gear mechanism is made idle by the control means so that the revolving rate of the input shaft is reduced to the revolving rate of the output shaft produced by multiplying the revolving rate of the input shaft by a ratio equivalent to the product of the speed change ratio of the belt drive means and the reduction gear ratio of the reverse-drive planetary gear mechanism.

Accordingly, it is an object of this invention to provide an improved continuously-variable speed transmission for motor vehicles, including individual planetary gear mechanisms for forward running and for reverse running, respectively, and being capable of allowing optional selection of the reduction gear ratios of the forward-drive and the reverse-drive planetary gear mechanisms.

A further object of this invention is to provide a compact and improved continuously-variable speed transmission for motor vehicles, including a forward-drive planetary gear mechanism and a reverse-drive planetary gear mechanism each of a simple planetary gear system.

A still further object of this invention is to provide a compact and improved continuously-variable speed transmission for motor vehicles, which transmission has an increased torque transmitting capacity and requires no additional provision of a reduction gear owing to the appropriate design of the reduction ratios of the forward-drive and the reverse-drive planetary gear mechanisms.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
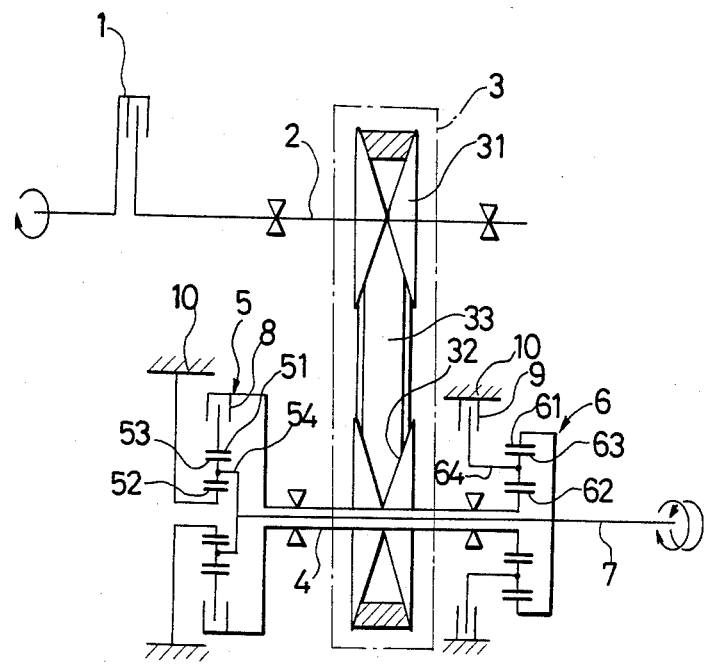
FIG. 1 is a schematic illustration of a continuously-variable speed transmission for motor vehicles in accordance with the invention.
Figure 2:
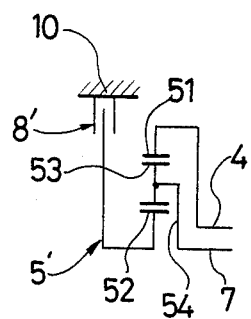
FIG. 2 is a schematic illustration of an alternative embodiment of a forward-drive planetary gear mechanism for the continuously-variable speed transmission of FIG. 1.

An exemplary continuously-variable speed transmission for motor vehicles in accordance with the invention is described referring to FIGS. 1 and 2.

Reference numerals 1, 2 and 3 designate a starting clutch connected to an internal combustion engine (not shown), an input shaft of a transmission rotatably supported on a casing 10 of the transmission, and a well-known belt drive device, respectively. The belt drive device 3 comprises an input variable pitch pulley 31 mounted on the input shaft 2 and including a fixed flange fixed to the input shaft 2 and a movable flange capable of being moved toward or away from the fixed flange by means of a hydraulic servomechanism (not shown) in order to regulate the distance between the fixed flange and the movable flange. The belt drive device 3 also comprises an output variable pitch pulley 32 mounted on an intermediate shaft 4 disposed in parallel to the input shaft 2 and rotatably supported on the transmission casing 10. The output variable pitch pulley 32 has a construction the same as that of the input variable pitch pulley 31, and a V-belt 33 interconnects the variable pitch pulleys 31, 32.

A forward-drive planetary gear mechanism 5 and a reverse-drive planetary gear mechanism 6 are interposed between the intermediate shaft 4 and an output shaft 7 of the transmission which shaft is rotatably supported on the transmission casing 10 coaxially with the intermediate shaft 4. The gear mechanisms 5, 6 are disposed independently and separately on the opposite sides of the output variable pitch pulley 32. The forward-drive planetary gear mechanism 5 comprises a ring gear 51 connected to the intermediate shaft 4 through a multiple disk clutch 8, a sun gear 52 connected to the transmission casing 10, planetary pinions 53 engaging both with the ring gear 51 and with the sun gear 52, and a planetary carrier 54 rotatably supporting the planetary pinions 53 and connected to the output shaft 7. The forward-drive planetary gear mechanism 5 serves also as a reduction gear.

The reverse-drive planetary gear mechanism 6 comprises a ring gear 61 connected to the output shaft 7, a sun gear 62 connected to the intermediate shaft 4, planetary pinions 63 engaged both with the ring gear 61 and with the sun gear 62, and a planetary carrier 64 rotatably supporting the planetary pinions 63 and engaged with the transmission casing 10 through a multiple disk brake 9. The reverse-drive planetary gear mechanism 6 serves also as a reduction gear. The output shaft 7 is connected to the driving axle of the motor vehicle through a conventional final reduction gear mechanism (not shown) of the hypoid gear type.

In the forward running mode of this continuously-variable speed transmission for motor vehicles, the multiple disk clutch 8 is engaged and the multiple disk brake 9 is released by operation of a hydraulic control circuit, so that power is transmitted from the input shaft 2 through the intermediate shaft 4 and the planetary carrier 54 to the output shaft 7. When the gear ratio between the ring gear 51 and the sun gear 52 is λ, the forward-drive planetary gear mechanism operates as a reduction gear having a reduction gear ratio of 1+λ.

During the reverse running mode of the continuously-variable speed transmission, the multiple disk clutch 8 is released while the multiple disk brake 9 is engaged, so that the power is transmitted from the input shaft 2 through the intermediate shaft 4, planetary pinions 63 and the ring gear 61 to the output shaft 7. When the gear ratio between the ring gear 61 and the sun gear 62 is λ, the reduction gear ratio of the reverse-drive planetary gear mechanism is 1/λ.

In an alternative embodiment of the forward-drive planetary gear mechanism 5 in accordance with the invention shown in FIG. 2, the forward-drive planetary gear mechanism 5' comprises a ring gear 51 connected directly to the intermediate shaft 4, a sun gear 52 connected to the transmission casing 10 through a brake 8', planetary pinions 53 and a planetary carrier 54 connected to the output shaft 7. This embodiment provides a reduction gear ratio the same as that of the embodiment of FIG. 1. Similar parts have the same reference numerals in the Figures.

Figure 3:
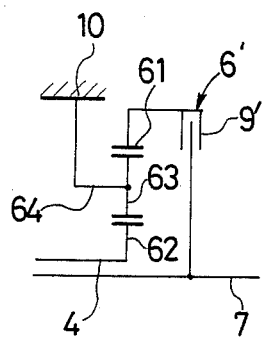
FIG. 3 is a schematic illustration of an alternative embodiment of a reverse-drive planetary gear mechanism for the continuously-variable speed transmission of FIG. 1.

FIG. 3 shows an alternative embodiment of the reverse-drive planetary gear mechanism 6. This reverse-drive planetary gear mechanism 6' comprises a ring gear 61 connected to the output shaft 7 through a clutch 9', a sun gear 62 connected to the intermediate shaft 4, planetary pinions 63 and a planetary carrier 64.

Figure 4:
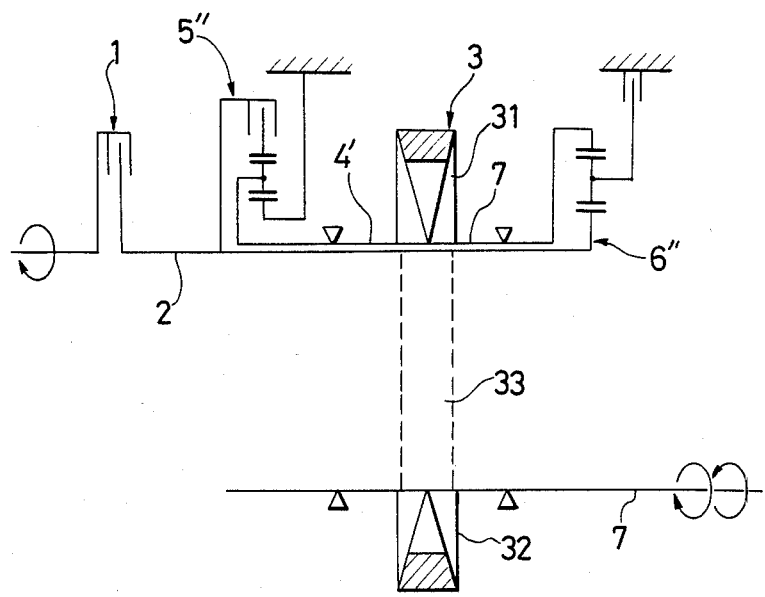
FIG. 4 is a schematic illustration of an alternative embodiment of a continuously-variable speed transmission for motor vehicles in accordance with the invention.

FIG. 4 shows an alternative embodiment of the continuously-variable speed transmission for motor vehicles in accordance with the invention, wherein a forward-drive planetary gear mechanism 5" and a reverse-drive planetary gear mechanism 6" are disposed separately on opposite sides of an input variable pitch pulley 31 and are interposed between the input shaft 2 and an intermediate shaft 4' which is disposed coaxially with the input shaft 2. The input variable pitch pulley 31 and the output variable pitch pulley 32 of a belt drive device 3 are mounted on the intermediate shaft 4' and the output shaft 7, respectively. Performance results are the same as described above.

It will be apparent from what has been described hereinbefore that, since a forward-drive planetary gear mechanism and a reverse-drive planetary gear mechanism are disposed separately on opposite sides of either input variable-pitch pulley or the output variable pitch pulley of a belt type continuously-variable change ratio device, and are employed as reduction gears, the continuously-variable speed transmission for motor vehicles in accordance with the invention eliminates need for the additional provision of a reduction gear. The continuously variable speed transmission can be compactly constructed and is capable of using planetary gear mechanisms of a single planetary pinion type since the transmission is exempt from constructional restrictions. Therefore, the continuously-variable speed transmission in accordance with the invention is compactly constructed, is excellent in durability, and has greater torque transmitting capacity. Furthermore, the respective reduction gear ratios of the forward-drive planetary gear mechanism and the reverse-drive planetary gear mechanism are subject to individual and optional selection.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A continuously variable speed transmission for motor vehicles comprising:
    a first shaft;
    a second shaft parallel to said first shaft;
    an intermediate shaft disposed side by side and parallel to said first shaft and arranged coaxial with and surrounding said second shaft;
    a first variable pitch pulley fixedly mounted to said first shaft for rotation therewith;
    a second variable pitch pulley fixedly mounted to said intermediate shaft for rotation therewith;
    an endless belt interconnecting said first and second variable pitch pulleys, said pulleys and belt comprising a belt type continuously variable change ratio device;
    a forward-drive planetary gear mechanism of a single planetary pinion type disposed on one side of said second variable pitch pulley and mounted on said intermediate shaft and subject to interconnecting said intermediate shaft and said second shaft;
    a reverse-drive planetary gear mechanism of a single planetary pinion type disposed on the other side of said second variable pitch pulley and mounted on said intermediate shaft and subject to interconnecting said intermediate shaft and said second shaft; and
    an individual control means provided for each of said forward and reverse drive planetary gear mechanisms for selectively interrupting the rotational transmission of the associated planetary gear mechanism between said intermediate shaft and said second shaft, whereby forward and reverse rotations are selectively provided at said second shaft.

2. A continuously variable speed transmission for motor vehicles as claimed in claim 1, wherein said first variable pitch pulley comprises a fixed flange fixed to said first shaft, and a movable flange mounted on said first shaft for axial sliding motion thereon, and said second variable pitch pulley comprises a fixed flange mounted to said intermediate shaft and a movable flange mounted to said intermediate shaft for axial sliding movement thereon, and further comprising a hydraulic servomechanism for controlling the distances between said fixed and associated movable flanges.

3. A continuously variable speed transmission for motor vehicles as claimed in claim 1, wherein said second shaft is an output shaft and said first shaft is an input shaft.

4. A continuously variable speed transmission for motor vehicles as claimed in claim 3, wherein the respective input gears of said forward-drive planetary gear mechanism and said reverse-drive planetary gear mechanism are connected to said intermediate shaft, while the respective output gears thereof are connected to said output shaft.

5. A continuously variable speed transmission for motor vehicles as claimed in claim 3, wherein the ring gear and the planetary carrier of said forward-drive planetary gear mechanism are connected to said intermediate shaft and said output shaft respectively, the sun gear and the ring gear of said reverse-drive planetary gear mechanism are connected to said intermediate shaft and said output shaft respectively.

6. A continuously variable speed transmission for motor vehicles as claimed in claim 5, wherein said control means provided for said forward-drive planetary gear mechanism comprises a clutch capable of engaging and disengaging said ring gear of said forward-drive planetary gear mechanism and said intermediate shaft.

7. A continuously variable speed transmission for motor vehicles as claimed in claim 5, wherein said control means provided for said forward-drive planetary gear mechanism comprises a brake capable of fixing to and releasing the sun gear of said forward-drive planetary gear mechanism from the transmission casing.

8. A continuously variable speed transmission for motor vehicles as claimed in claim 5, wherein said control means provided for said reverse-drive planetary gear mechanism is a brake capable of fixing to and releasing the planetary carrier of said reverse-drive planetary mechanism from the transmission casing.

9. A continuously variable speed transmission for motor vehicles as claimed in claim 5, wherein said control means provided for said reverse-drive planetary gear mechanism is a clutch capable of engaging and disengaging the ring gear of said reverse-drive planetary gear mechanism and said output shaft.

10. A continuously variable speed transmission for motor vehicles as claimed in claim 1, wherein said first shaft is an output shaft and said second shaft is an input shaft.

11. A continuously variable speed transmission for motor vehicles as claimed in claim 10, wherein the respective input gears of said forward-drive planetary gear mechanism and said reverse-drive planetary gear mechanism are connected to said input shaft and the respective output gears thereof are connected to said intermediate shaft.

12. A continuously variable speed transmission for motor vehicles as claimed in claim 10, wherein the ring gear and the planetary carrier of said forward-drive planetary gear mechanism are connected to said input shaft and said intermediate shaft respectively, and the sun gear and the ring gear of said reverse-drive planetary gear mechanism are connected to said input shaft and said intermediate shaft respectively.

13. A continuously variable speed transmission for motor vehicles as claimed in claim 12, wherein said control means provided for said forward-drive planetary gear mechanism is a clutch capable of engaging and disengaging said ring gear and said input shaft.

14. A continuously variable speed transmission for motor vehicles as claimed in claim 12, wherein said control means provided for said forward-drive planetary gear mechanism is a brake capable of fixing to and releasing the sun gear of the forward-drive planetary gear mechanism from the transmission casing.

15. A continuously variable speed transmission for motor vehicles as claimed in claim 12, wherein said control means provided for said reverse-drive planetary gear mechanism is a brake capable of fixing to and releasing the planetary carrier of the reverse-drive planetary gear mechanism from the transmission casing.

16. A continuously variable speed transmission for motor vehicles as claimed in claim 12, wherein said control means provided for said reverse-drive planetary gear mechanism is a clutch capable of engaging and disengaging said ring gear and said output shaft.

* * * * *